United States Patent
Agrawal et al.

(10) Patent No.: US 7,203,679 B2
(45) Date of Patent: Apr. 10, 2007

(54) DETERMINING STRUCTURAL SIMILARITY IN SEMI-STRUCTURED DOCUMENTS

(75) Inventors: Neeraj Agrawal, New Delhi (IN); Sachindra Joshi, New Delhi (IN); Raghuram Krishnapuram, New Delhi (IN); Sumit Negi, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/629,133

(22) Filed: Jul. 29, 2003

(65) Prior Publication Data

US 2005/0038785 A1    Feb. 17, 2005

(51) Int. Cl.
*G06F 17/30* (2006.01)

(52) U.S. Cl. .................. 707/6; 707/2; 707/3; 707/101; 715/513

(58) Field of Classification Search ............ 707/3, 707/6, 100, 103, 103 R, 103 Y, 7, 1; 715/513, 715/517
See application file for complete search history.

(56) References Cited

U.S. PATENT DOCUMENTS

| | | | |
|---|---|---|---|
| 6,487,555 B1* | 11/2002 | Bharat et al. ............... | 707/10 |
| 6,519,557 B1* | 2/2003 | Emens et al. ............... | 704/8 |
| 6,598,054 B2* | 7/2003 | Schuetze et al. ........ | 707/103 R |
| 6,622,139 B1* | 9/2003 | Nakayama et al. ......... | 707/3 |
| 6,658,626 B1* | 12/2003 | Aiken ......................... | 715/526 |
| 6,738,759 B1* | 5/2004 | Wheeler et al. ............ | 707/3 |
| 6,826,568 B2* | 11/2004 | Bernstein et al. .......... | 707/6 |
| 6,845,380 B2* | 1/2005 | Su et al. ..................... | 707/102 |
| 6,853,992 B2* | 2/2005 | Igata ........................... | 707/3 |
| 6,889,223 B2* | 5/2005 | Hattori et al. .............. | 707/3 |
| 6,920,609 B1* | 7/2005 | Manber et al. ............. | 715/513 |
| 2003/0028564 A1* | 2/2003 | Sanfilippo .................. | 707/513 |
| 2004/0205454 A1* | 10/2004 | Gansky et al. ............. | 715/500 |

OTHER PUBLICATIONS

Isabel F. Cruz and Slava Borisov and Michael A. Marks and Timothy R. Webb, "Measuring Structural Similarity Among (Web) Documents: Preliminary Results", Lecture Notes in Computer Science vol. 1375, p. 513, 1998.*

Isabel F. Cruz and Slava Borisov and Michael A. Marks and Timothy R. Webb, "Measuring Structural Similarity Among {Web} Documents: Preliminary Results", *Lecture Notes in Computer Science*, vol. 1375, p. 513, 1998.

Andrew Nierman, H. V. Jagadish, "Evaluating Structural Similarity in XML Documents", *Proceedings of the Fifth International Workshop on the Web and Databases (WebDB 2002)*, Jun. 2002.

* cited by examiner

*Primary Examiner*—Tim Vo
*Assistant Examiner*—Dangelino Gortayo
(74) *Attorney, Agent, or Firm*—Gibb I.P. Law Firm, LLC; T. Rao Coca, Esq

(57) ABSTRACT

Documents are represented based on their structure, which arises from the relationship between various elements in the document. After representing documents based on their structure in vector form, a method of measuring similarity between vectors is used to obtain the measure of structural similarity between two given documents.

30 Claims, 5 Drawing Sheets

DETERMINING STRUCTURAL SIMILARITY IN SEMI-STRUCTURED DOCUMENTS

FIELD OF THE INVENTION

The present invention relates to determining structural similarity in semi-structured documents.

BACKGROUND

Several methods exist that model documents as labeled trees. These methods are based on the fact that any semi-structured document that uses a markup language can be represented as a tree such as a Document Object Model (DOM) tree. The labels of the nodes correspond to the tags in the markup language. These methods define the structural dissimilarity between a pair of documents as the edit distance between the corresponding labeled trees. This is the tree model for the representation of the structural information.

The basic idea behind all tree edit distance algorithms is to find the cheapest sequence of edit operations that will transform one tree into another. Some of these methods model documents as ordered labeled trees, while others model them as unordered labeled trees. In general, finding the edit distance between unordered labeled trees is computationally more complex than finding the edit distance between ordered labeled trees. A key differentiator among the various tree distance algorithms is the set of edit operations allowed.

Some work in this area used insertion and deletion of leaf nodes and relabelling of a node anywhere in the tree. Several other approaches with different sets of edit operations are proposed. These tree edit distance measures have been modified to address issues such as repetitive and optional fields.

For instance, Nierman et al [Andrew Nierman, H. V. Jagadish, "Evaluating Structural Similarity in XML Documents", *Proceedings of the Fifth International Workshop on the Web and Databases* (*WebDB* 2002), June 2002] propose a dynamic programming algorithm that computes the distance between any pair of documents taking into account Extensible Markup Language (XML) issues such as optional and repeated sub-elements. Andrews et al further give a method to cluster documents based on this distance measure. The algorithm to compute the tree edit distance for a pair of documents is of quadratic complexity in the combined size of the two documents.

Cruz et al [Isabel F. Cruz and Slava Borisov and Michael A. Marks and Timothy R. Webb, "Measuring Structural Similarity Among Web Documents: Preliminary Results", *Lecture Notes in Computer Science*, volume 1375, page 513, 1998] propose an alternative approach to modeling structure based on tag frequency measures. This approach can be viewed as the node model for the representation of the structural information, since this approach only uses information about the tags of the various nodes in the corresponding tree model.

The method of Isabel et al relies on the assumption that tag frequencies reflect some inherent characteristics of Web documents and correlate with its structure. While the node model is very simple, the model does not take into account the order in which tags appear. Therefore, if the tags of all nodes are rearranged, the representation does not change. Thus, the model is adequate only when the templates are drastically different from each other, that is, they have very few tags in common. This is rarely the case in practice.

In view of the above comments, a need clearly exists for an improved manner of comparing documents for determining the structural similarity of the documents.

SUMMARY

Techniques are presented herein for measuring the similarity between two pages based on their structural syntax. Structurally similar pages may differ in their textual and numeric contents. Documents, as well as document collections, are represented as vectors of feature values. These features are based on the words and phrases occurring in the document collection. Therefore, this representation of a document describes text (or possibly semantic) content of documents, and the similarity values describe a type of text or content similarity between the documents.

Several techniques exist to measure similarity between two numeric vectors. Such techniques are used to measure the similarity between two documents, and between a document and a document collection.

For measuring the structural similarity between documents, documents are represented based on their structure. The structure arises from the various elements on the document and the nature of their nesting. After representing documents based on their structure in vector form, an existing method of measuring similarity between vectors is used to obtain the measure of structural similarity between two given documents.

DETAILED DESCRIPTION

Two documents are typically assessed to be structurally similar if they have a similar "look and feel", or layout. By way of example, structurally similar pages might be generated in the following ways:

Pages generated by providing values to a predetermined master shell page.

Pages dynamically generated on servers using server code

Pages generated in accordance of a template.

The techniques now described define a procedure for conducting a comparison of documents to reach a quantitative determination of the degree of structural similarity between documents.

Document Object Model

A document is modelled as a labeled tree in the Document Object Model (DOM). In the labeled tree model of a document, each node in the tree corresponds to an element of the markup language in the document. The tag name of an element acts as a label for the node. The inclusion of a tag inside the scope of another tag is captured by a "parent-child" relationship in the labeled tree. Text nodes are excluded from the labeled tree, as text nodes are immaterial to the structural properties of the document. The tree representation of a document is sometimes known as the DOM (Document Object Model) tree.

Figure 1:
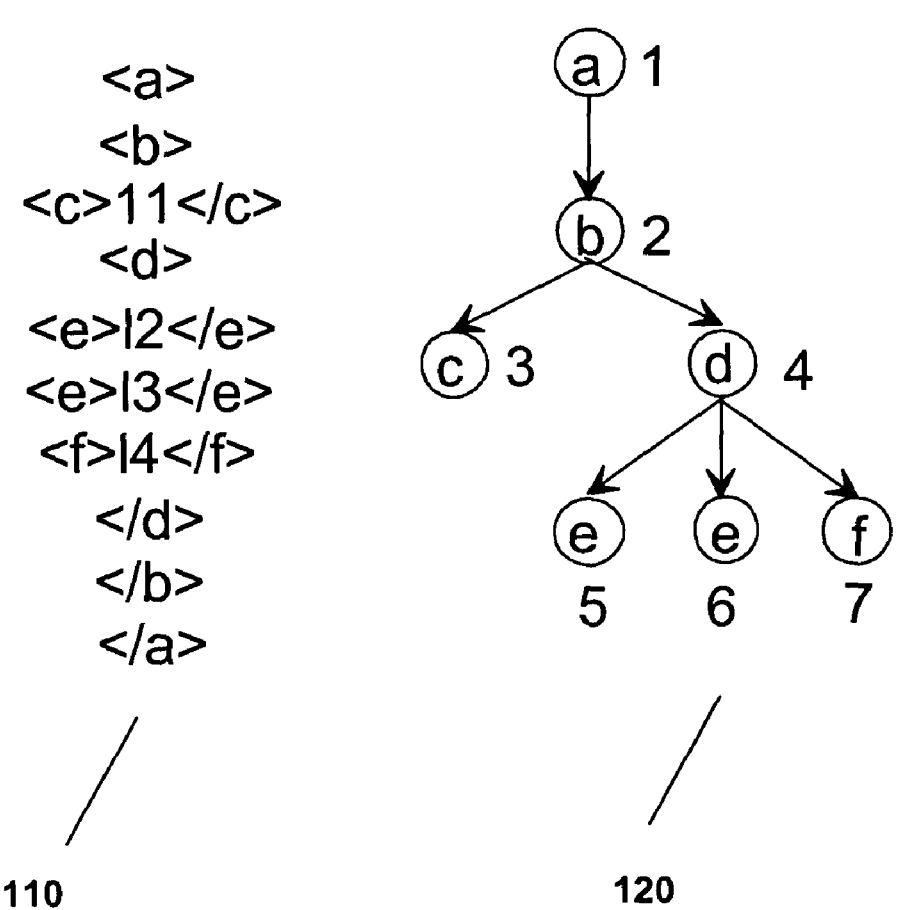
FIG. 1 is a schematic representation of an XML document and a corresponding labeled tree.

FIG. 1 depicts an XML document 110 and its corresponding DOM tree 120. Given a semi-structured document, one can generate its DOM tree manually, or using any suitable parser programme that analyses XML or related documents. Examples of suitable parsers are Xerces, XML4J, and Jtidy, though any suitable parser can of course be used. These and other suitable packages are generally available via the Web. The Jtidy package not only corrects common HTML errors, but also "XMLizes" the document and provides the corresponding DOM tree for the document.

FIG. 1 depicts an XML document 110 and its corresponding DOM tree 120. All other tags appearing in the document are contained within the scope of tag <a> (that is, the document tags appear between <a> and </a>) in the XML document 110, and therefore the root node in the corresponding DOM tree is labeled as a in 120. Tags <c> and <d> appear within the scope of tag <b> as directly nested tags and therefore nodes 3 and 4, with the labels c and d respectively, are the children of node 2 in the tree 120. Two <e> tags and an <f> tag are directly nested inside the <d> tag in 110 and are therefore the children of node 4 are appropriately labeled in 120.

Bag of Tree Paths Model

In the bag of tree paths model, a document is represented by a set of sequences of labels that occur in the paths from the root node to the leaf nodes of the corresponding tree representation (in this case, a DOM tree). The path from the root node to any leaf node contains the root node, the leaf node, and all the intermediate nodes required to reach the leaf node in sequence. Each such path contributes a sequence of labels to the model.

As an example, leaf node 3 of the DOM tree 120 given in FIG. 1 contributes the sequence a/b/c. Similarly, node 5 contributes the sequence a/b/d/e. The same sequence of node labels can occur in two or more distinct paths. For example, node 5 and 6 in FIG. 1 contributes the same sequence of node labels. A sequence of node labels is referred to as a path.

Let $D=\{d_1, d_2, \ldots, d_n\}$ be the collection of n trees corresponding to n documents. Let $m_i$ be the number of leaf nodes present in tree $d_i$. There are thus mi paths in tree $d_i$. A dictionary of distinct paths $Dict_{paths}$ can be constructed by collating such paths from all trees $d_i$, $1 \leq i \leq n$. Not all paths, however, are equally important for describing the structure of documents in the bag of tree paths model. Thus, feature selection techniques are used to remove non-informative paths, to simplify the model. Paths that occur in very few documents, and paths that occur in almost all documents, are desirably eliminated from the dictionary. In general, however, any feature selection method that is deemed suitable can be used.

Let the dictionary of paths after feature selection be $Dict_{paths}=\{p_1, p_2, \ldots, p_N\}$. Let $f_j(p_i)$ denote the frequency of occurrence of path $p_i$ in document $d_j$, and let $f_{max}=\max_{ij} f_j(p_i)$. Now a document $d_j$ can be represented as a N-dimensional vector $[d_{j1}, d_{j2}, \ldots, d_{jN}]$, where $d_{jk}=f_j(p_k)/f_{max}$, $1 \leq k \leq N$.

The bag of tree paths model for a document captures only some of the structural relationships present in the tree. More precisely, the bag of tree paths model incorporates all the parent/child relationships, but ignores sibling relationships present in the tree structure.

The similarity between a pair of documents $(d_j, d_l)$ is defined as expressed in Equation [1] below.

$$sim(d_i, d_l) = \frac{\sum_{k=1}^{N} \min(d_{ik}, d_{lk})}{\sum_{k=1}^{N} \max(d_{ik}, d_{lk})} \quad [1]$$

The numerator of the right hand side of Equation [1] is the sum (over all paths k in the dictionary of paths) of the minimum of the two frequencies of occurrence of a path k in the two documents $d_i$ and $d_j$. This is a measure of how much the two documents have in common in terms of the various paths that appear in the dictionary. The denominator of Equation [1] is the sum of the maximum of the frequencies of occurrence over all paths k, and serves as a normalizations factor.

The frequencies $f_j(p_i)$ can be ignored, and the occurrence or non-occurrence of the path used. In other words, $d_j$ is a binary vector. An important aspect of the bag of tree paths model is that the model can take into account markup language issues, such as repetition of elements in the similarity measure. Ideally, similarity value between a pair of documents should be high if the documents differ only in the number of times a particular markup language subelement occurs under an element.

Figure 2:
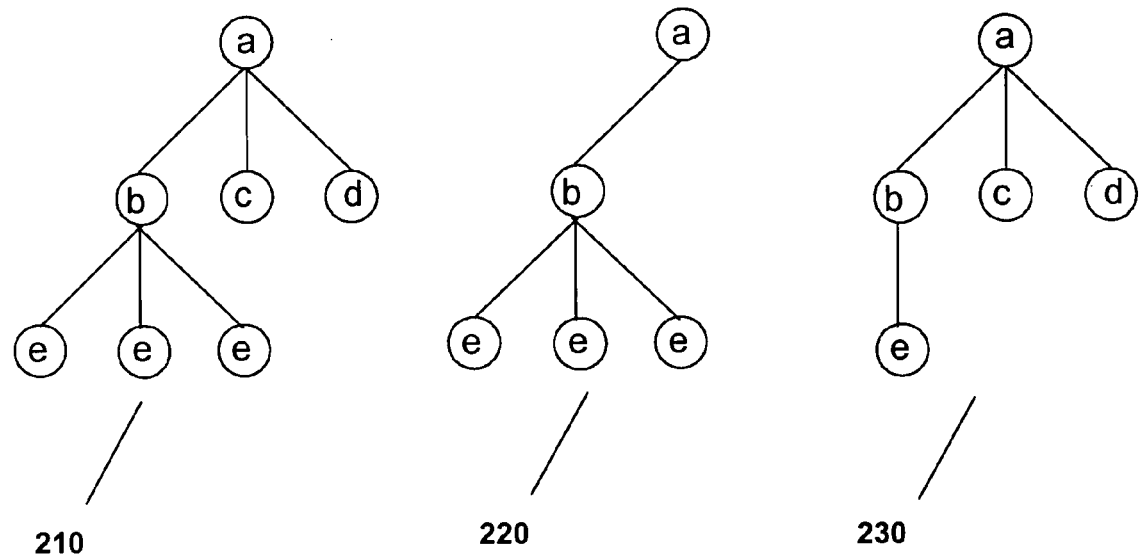
FIG. 2 is a schematic representation of three respective Document Object Model (DOM) trees that are represented for purpose of comparison.

FIG. 2 schematically represents three DOM trees 210, 220, 230. A meaningful similarity measure should yield a higher value of similarity for the pair of trees 210 and 230 than for the pair of trees 210 and 220. All the paths that appear in tree 210 also appear in tree 230. These trees only differ in the frequency of the path a/b/e. By contrast, the tree 210 has two paths that do not appear in tree 220 at all. The proposed similarity measure determines that two documents that differ only in the frequency of the paths to be more similar than two documents that differ in the occurrence of paths.

The parent-child relationship is sufficient for measuring the structural similarity of documents, if the documents contain many levels of nesting (that is, the depth of the corresponding trees is relatively high). If, however, the documents do not contain many levels of nesting (that is, the corresponding trees are shallow), then the documents will more probably contain the same paths, even if the overall structure differs substantially. For this reason, a preferred model, referred to as the bag of XPaths model, is described.

Bag of XPaths Model

The bag of XPaths model is described, which captures some sibling information in addition to all the parent/child relationships captured in the bag of tree paths model described above.

In the bag of Xpaths model, a representation of a document as a labeled tree includes a positional index along with the label for each node. The positional index of a node n advises that the number of previous sibling nodes with the same label as that of node n.

Figure 3:
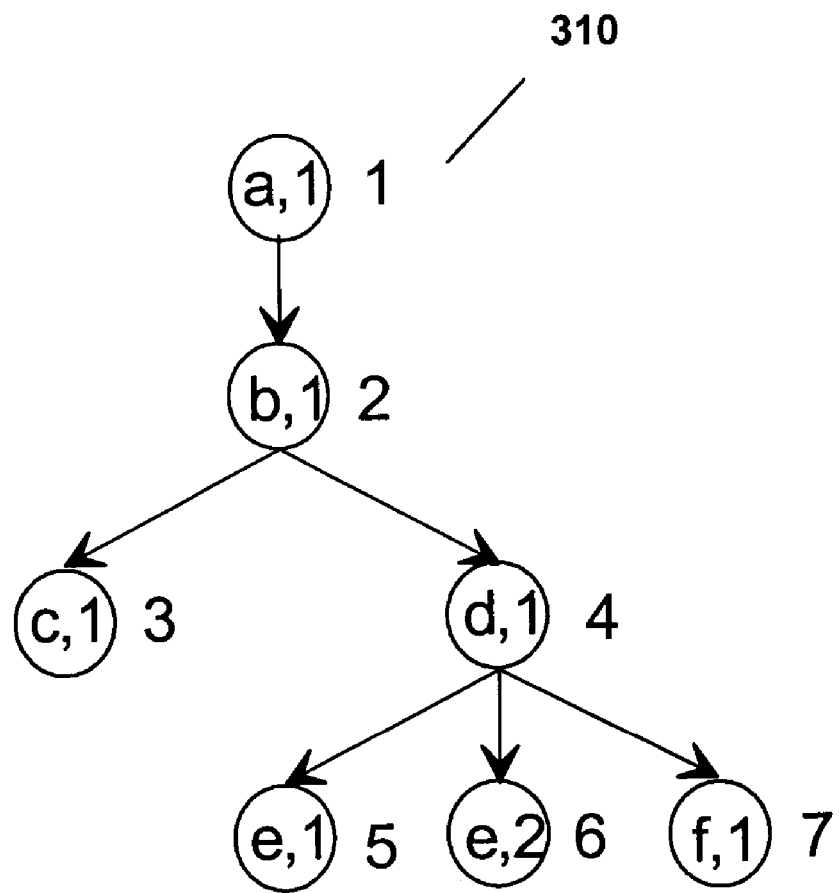
FIG. 3 is a schematic representation of an example DOM tree labeled with positional indices, and is represented for the purpose of discussion.

FIG. 3 shows an example of a labeled tree 310. Each node in the tree contains a label as well as a positional index. The term index is used as an abbreviation for positional index. An XPath is defined in some contexts to be a path expression that locates nodes in a DOM tree. The term is used herein, however, to mean any mechanism to describe a path in a tree representation of a document that includes, with the label of a node, the information about the number of siblings of the nodes that have the same label as the node. Consequently, an XPath, as used herein, is essentially a form of path representation, in which particular path-specific information is included, in varying degrees of specificity.

The term XPath is defined herein as a sequence of terms separated by the character '/'. The syntax for each term is as follows: term=nodetest[predicate]. In the existing technical literature, however, the term XPath is used more generically to denote path expressions that locate nodes in a DOM tree. There are several ways to express the location of a set of nodes in a DOM tree using XPaths. As noted above, though the term XPath is used herein in a more precise and restricted sense. An XPath is considered herein as a path in a tree representation of a document that has the capability to include the positional information of the preceding siblings that have the same label as a given node in the tree.

The term nodetest is a label that defines a set of nodes (which are referred to as a node-set), in which each node in the set is a child node of the current node that has nodetest as its label. The label table is an example of nodetest. A predicate filters the node-set specified by the nodetest further into a smaller node-set and is always placed inside a pair of square brackets. [position( )=index] and [position( )<7] are examples of predicates.

Predicates of the form [position( )=index] are abbreviated as [index]. A predicate is called an equality predicate if the predicate is of the form [position( )=index]. Other predicates are termed generalized predicates. An XPath is called an equality XPath if all the terms in the XPath contain only equality predicates. If some of the terms in an XPath contain generalized predicates, the XPath is called a generalized XPath. For example, in FIG. 3, the XPath for node 3 is /a[1]/b[1]/c[1]. For node 6, the XPath is /a[1]/b[1]/d[1]/e[2].

Both of these XPaths are equality XPaths. The XPath of the form /a[1]/b[1]/d[1]/e[position( )<3], is an example of a generalized XPath which evaluates to the node-set containing node 5 and node 6. Note that the last term of the XPath contains a generalized predicate. If any of the terms in an XPath contains a wildcard (that is, "*") or appears without a predicate, then the Xpath is still considered to be a generalized XPath. A nodetest of a term is referenced by term.nodetest. Similarly, the predicate can be referenced by term.predicate. An index of an equality term can be referenced by term.index.

An XPath not only captures the parent/child relationships between nodes but also incorporates some sibling information. For example, in an equality XPath, a positional index that occurs in a term indicates how many preceding siblings have the same nodetest (that is, have the same node label) in the DOM tree. An XPath, however, does not capture sibling information of nodes whose node labels are different from that of the given node. For example, the XPath for node 6 in FIG. 3 is /a[1]/b[1]/d[1]/e[2]. The positional index 2 for the node label e shows that this node has another sibling node with the label e. There is no reference hence to the sibling node f.

A document d can be defined by the set of all equality XPaths corresponding to the leaf nodes of the DOM tree for d. Note that each equality XPath occurs only once in a document.

A dictionary $Dict_{XPath}$ can be constructed in a fashion similar to the one described in the bag of paths model, based on the equality XPaths for all the leaf nodes of the DOM trees in the document collection. Taking account of issues such as repetitions is not straightforward in this model. Elements that appear as a result of repetition differ in their positional indices, and thus have different XPaths. This is unlike the situation in the bag of tree paths model, in which all such paths are identical. Therefore, if the similarity measure defined for the bag of tree paths model is directly used in the bag of XPaths model, two documents that differ only in the number of repeating elements will have a relatively low similarity value.

If the number of repeating elements are different, then there are some XPaths that differ only in the positional index. An element gets its positional index based on how many preceding sibling nodes have the same label. For a case in which the number of repetitive elements is different in the two documents, there will be a different number of preceding siblings with the same label. Accordingly, an alternative similarity measure, which incorporates the issue of repetition for the bag of XPaths model, is now defined.

Similarity Measure

A special type of defined generalized predicate is referred to as repetitive predicate. A repetitive predicate is of the form [(position( )−init) mod diff=0]. [(position( )−1) mod 5=0] is an example of repetitive predicate, in which the function position( ) returns the positional index of the node. The index values 1, 6, 11, etc. satisfy this repetitive predicate. In this example, the value of diff is 5 and the value for init is 1. Now, one may observed that [(position( )−1) mod 5=0] is satisfied for the $1^{st}$ position, $6^{th}$ position, and so on. That is, for positions that satisfy the expression [(6−1) mod 5]=0].

A generalized XPath, which contains only equality and repetitive predicates, is called a repetitive XPath. As such a repetitive XPath contains at least one repetitive predicate as defined above.

Table 1 below presents pseudocode that defines a Boolean function called subsume($X_1, X_2$), in which $X_1$ and $X_2$ are XPaths (either equality or repetitive). The function returns "true" if the set of nodes evaluated by the XPath $X_2$ is a subset of the nodes evaluated by $X_1$ for the same tree. When the function returns "true", the XPath $X_1$ is said to subsume the XPath $X_2$.

As an example, consider two XPaths $X_1$=/tag1[1]/tag2 [(position( )−1 mod 5)=0] and $X_2$=/tag1[1]/tag2[1]. All nodes evaluated by $X_2$ are also evaluated by $X_1$, and hence one concludes that the XPath $X_1$ subsumes the XPath $X_2$. The function subsume given in Table 1 below does not evaluate the given XPaths on a tree, but uses another way to determine subsumption. In this algorithm, the function depth returns the number of terms present in the given XPath. The function evaluate(p,i) returns "true" if the index i satisfies the predicate p. Here, $term^j_i$ represents the $j^{th}$ term in the XPath $X_i$. The algorithm compares the given XPaths term by term and returns true if predicates for all the terms either match exactly or the index of second XPath is satisfied by the predicate of first XPath.

TABLE 1

```
boolean subsume(X₁ X₂) {
    if (depth(X₁) ≠ depth(X₂))
        return false
    flag = true ;
    for every term tᵢ of Xpath Xᵢ do
        if (termᵗ₁.nodetest ≠ termᵗ₂.nodetest)
            return false
        if (termᵗ₁.predicate ≠ termᵗ₂.predicate)
            continue
```

TABLE 1-continued

```
    else
        let p be the term¹₁.predicate
        if (p is equality predicate)
            return false
        else
            flag = flag ^ evaluate(p,term¹₂.index)
        return flag
}
```

Table 2 below presents pseudocode that defines a function called generalize($X_1,X_2$). This code either returns a generalized(repetitive) XPath that subsumes both XPaths $X_1$ and $X_2$, or returns "null". As an example, consider two XPaths $X_1$=a[1]/b[1]/c[1]/d[1] and $X_2$=a[1]/b[1]/c[6]/d[1]. The function generalize($X_1,X_2$) returns the generalized XPath $X_g$=a[1]/b[1]/c[(position( )-1) mod 5=0]/d[1]. The predicate c[(position( )-1) mod 5=0] will evaluate to c[1], c[6], c[11] and so on.

TABLE 2

```
boolean generalize(X₁ X₂) {
    if (depth(X₁) ≠ depth(X₂))
        return null
    gxpath = ""
    for every term tᵢ of Xpath Xᵢ do
        if (term¹₁.nodetest ≠ term¹₂.nodetest)
            return null
        if (term¹₁.index == term¹₂.index)
            gxpath = gxpath + "/" + term¹₁
            continue
        else
            diff = |term¹₁.index ≠ term¹₂.index|
            init =term¹₁.index mod diff
            gxpath = gxpath + "/" +term¹₁nodetest + "[" + ((position( ) – init)
                mod diff) == 0 +
    "]"
    return gxpath
}
```

A document $d_i$ can be represented as a N bit binary vector where N is the number of terms in $Dict_{XPaths}$. Let $D_{ei}$ denote the set of all equality XPaths that are present in document $d_i$.

Note that $D_{ei} \subset Dict_{XPaths}$. A set of generalized XPaths is generated, based on pairs of equality XPaths in $D_{ei}$ using the algorithm defined in Table 2. Let $D_{gi}$ denote the set of all generalized XPaths that are obtained using generalize($X_1$, $X_2$). The algorithm attempts to generalize two equality XPaths only if both of them have the same tree path, that is, the two equality XPaths without the positional indices must be identical. A tree path to XPath index is created so that for any given tree path, one can quickly obtain the set of equality XPaths that have the same tree path.

Let X denote one such set of equality XPaths, and let T be the number of terms in any XPath $\epsilon$ X. All the XPaths will have same number of terms. A pair of XPaths $X_1$ and $X_2$ are chosen in X, such that there exists some i; $1 \leq i \leq T$ for which $term_1^i.index \neq term_2^i.index$. Here $term_1^i.index$ and $term_2^i.index$. are the lowest two indices for the $term_1^i.nodetest$ and $\forall k$, k≠i, $term_1^k.index=term_2^k.index$.

That is, two XPaths are generalized if and only if they differ in the positional index at exactly one term t. Further, the two indices should be the lowest two indices that occur for the label associated with the term t in the set X. Therefore, the number of generalized XPaths that one can derive from a tree path is bounded by T.

The complete set of XPaths for document $d_i$ is $D_{ei} \cup D_{gi}$. Now, the similarity measure for a pair of documents $d_i$ and $d_j$ can be defined as follows as expressed in Equation [2] below.

$$sim(d_i, d_j) = \frac{e + s}{n + m - e} \quad [2]$$

In Equation [2] above, e is the number of XPaths that are common to both $d_i$, $d_j$. The term s is the total number of XPaths that do not exactly match but are subsumed by at least one of the generalized XPaths of the other document. The term n is the number of XPaths in $d_i$, and m is the number of XPaths in $d_j$. To compute s, the function subsume described above with reference to Table 1 is used.

The subsume and generalize functions, given in Tables 1 and 2 respectively, incorporate the issue of repetition in the bag of XPaths model. This model can accommodate other aspects, such as optional elements and recursive elements, by using other subsume and generalize functions. If the application at hand requires optional and recursive control structures to be incorporated in the similarity measure, suitable subsume and generalize functions for these control structures can be used. In other words, the functions subsume and generalize for specific control structures can be designed based on the application at hand.

Overview of Procedure

Figure 4:
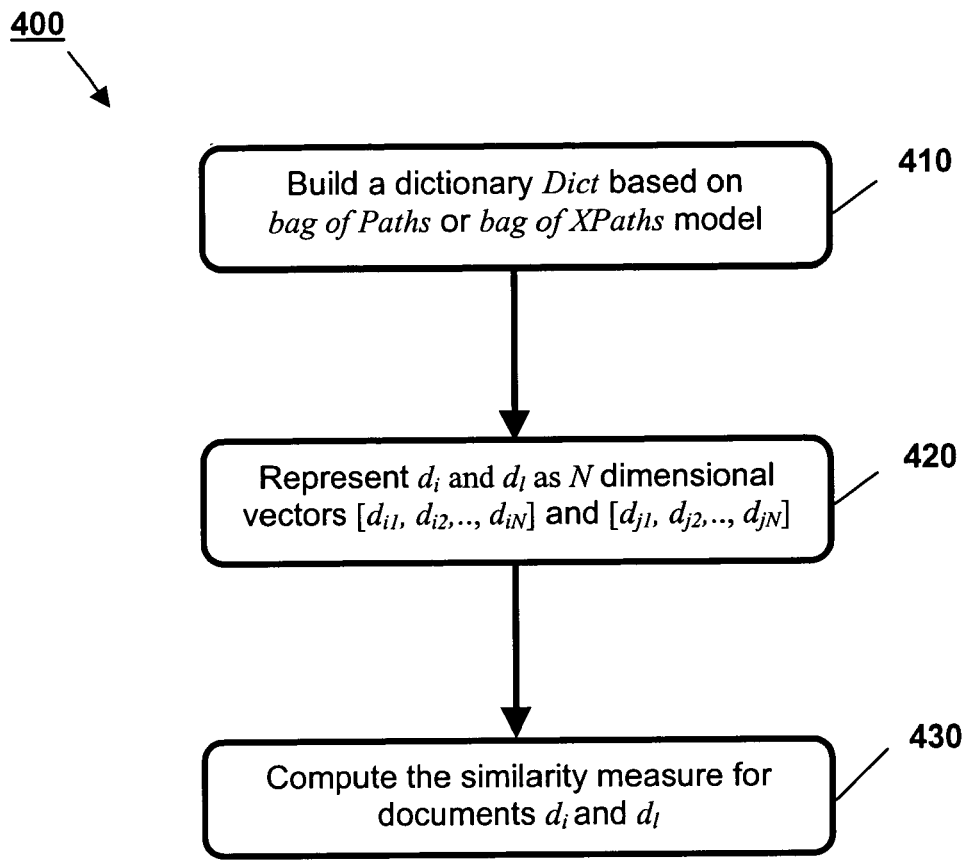
FIG. 4 is a flowchart of steps in a procedure for comparing a pair of documents.

FIG. 4 is a flowchart 400 that represents, in overview, steps in a simple example of comparing two documents. The flowchart 400 describes the procedure for obtaining the similarity between two documents $d_i$ and $d_j$ in a given document collection. These steps are as outlined below.

Step 410
Model all the documents as labeled trees and build a dictionary of paths or XPaths based on the bag of Paths or bag of XPaths model as required. Let Dict{$p_1$, $p_2$, . . . , $p_N$} be the dictionary of size N.

Step 420
Represent each document $d_j$ in the collection as an N-dimensional vector [$d_{j1}$, $d_{j2}$, . . . , $d_{jN}$], where element i of the vector, that is, $d_{ji}$ denotes the value of some feature associated with path $p_i$, such as the presence or absence of path $p_i$, or the frequency of occurrence of path $p_i$ in the document.

Step 430
Use the similarity measure given in Equation [1] or Equation [2] to obtain the similarity value between two documents based on the bag of Paths model or bag of XPaths model.

Implementation Using Computer Hardware and Software

Figure 5:
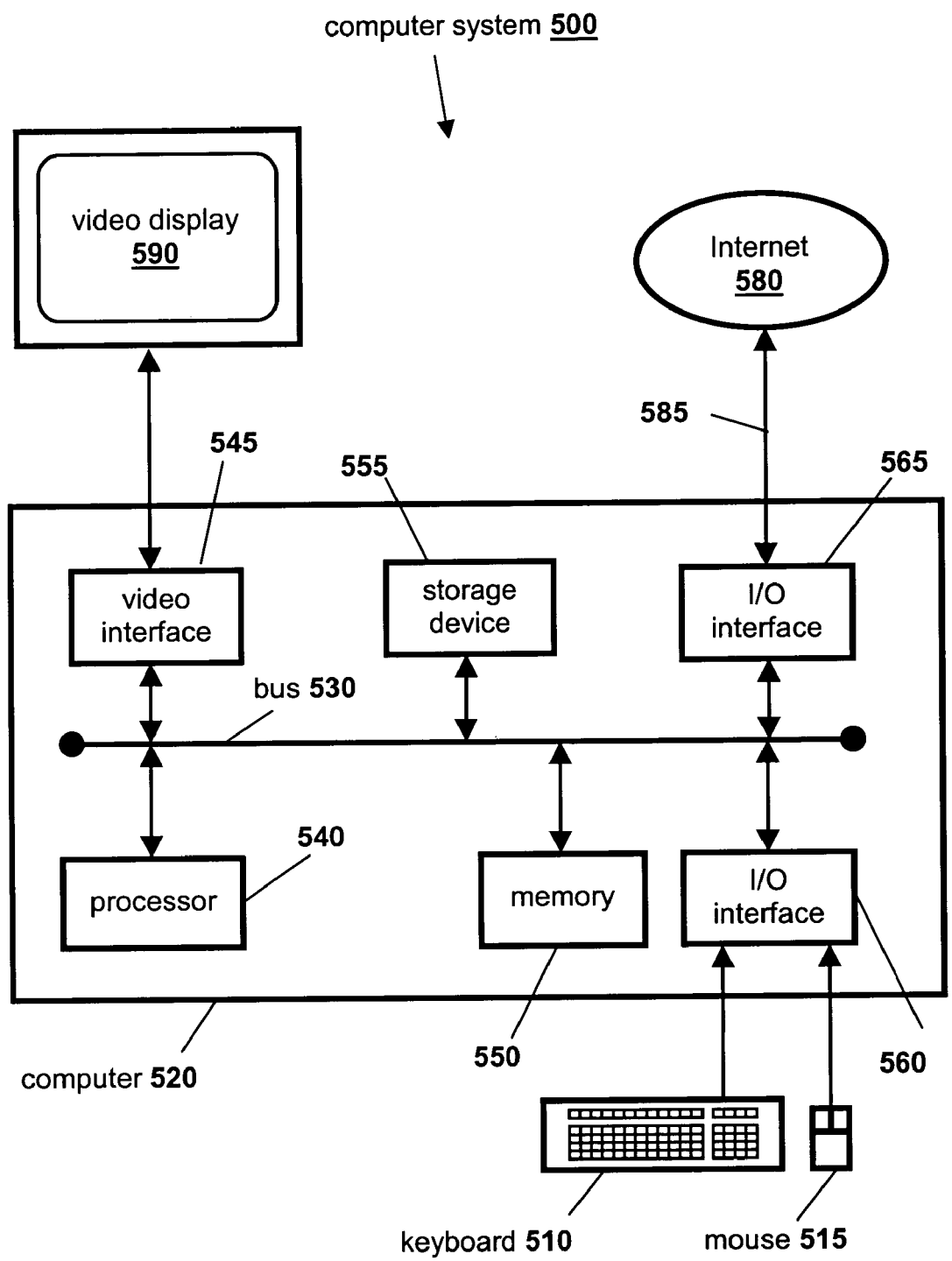
FIG. 5 is a schematic representation of a computer system suitable for performing the techniques described with reference to FIGS. 1 to 4.

FIG. 5 is a schematic representation of a computer system 500 that can be used to implement the techniques described herein. Computer software executes under a suitable operating system installed on the computer system 500 to assist in performing the described techniques. This computer software is programmed using any suitable computer programming language, and may be thought of as comprising various software code means for achieving particular steps.

The components of the computer system 500 include a computer 520, a keyboard 510 and mouse 515, and a video display 590. The computer 520 includes a processor 540, a memory 550, input/output (I/O) interfaces 560, 565, a video interface 545, and a storage device 555.

The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to video display 590 and provides video signals for display on the video display 590. User input to operate the computer 520 is provided from the keyboard 510 and mouse 515. The storage device 555 can include a disk drive or any other suitable storage medium.

Each of the components of the computer 520 is connected to an internal bus 530 that includes data, address, and control buses, to allow components of the computer 520 to communicate with each other via the bus 530.

The computer system 500 can be connected to one or more other similar computers via a input/output (I/O) interface 565 using a communication channel 585 to a network, represented as the Internet 580.

The computer software may be recorded on a portable storage medium, in which case, the computer software program is accessed by the computer system 500 from the storage device 555. Alternatively, the computer software can be accessed directly from the Internet 580 by the computer 520. In either case, a user can interact with the computer system 500 using the keyboard 510 and mouse 515 to operate the programmed computer software executing on the computer 520.

Other configurations or types of computer systems can be equally well used to implement the described techniques. The computer system 500 described above is described only as an example of a particular type of system suitable for implementing the described techniques.

Example Applications of Document Similarity Measures

Application to Information Extraction

There has been much work in the area of information extraction from Web pages in the recent years. One approach to this problem is to generate a wrapper using an example page. The fields that contain the desired information are indicated by the user. A wrapper is created to capture the extraction rules based on the patterns exhibited by the indicated fields in the example page. The wrapper is then used to extract similar information from all the pages that are structurally similar to the given example page. This approach, however, requires that all structurally similar pages are first identified and grouped. The proposed similarity measure can be used to cluster pages based on structural similarity.

Application to Document Type Defining (DTD) Induction

In the case of XML documents, knowledge of the DTD can facilitate the identification of structurally similar pages. Unfortunately, most of the XML documents on the Web are found without their DTDs. There are several induction algorithms that attempt to learn the DTD from a set of examples. These approaches assume that all the examples come from the same DTD. If the XML pages in a given collection come from different DTDs, these algorithms cannot be used directly, since it is theoretically infeasible to learn a single DTD for the entire collection. A possible solution is to partition the collection into smaller sets of "structurally similar" documents, and then learn the DTD for each set. Again, one can use the proposed similarity measure to cluster the pages based on "structural similarity".

Application to Template Removal

Common information contained in templates hinders the performance of many information retrieval and data mining algorithms. The common information is sometimes referred to as template information. Using the similarity measure described herein, one can determine an approach to identify this template information. The documents from a collection are first clustered based on their structure. A cluster contains pages that share a common look and feel. The text that appears at the same location in different pages within a cluster is identified as the common information.

CONCLUSION

A method, computer software, and a computer system are each described herein in the context of document structure comparison. Various alterations and modifications can be made to the techniques and arrangements described herein, as would be apparent to one skilled in the relevant art.

We claim:

1. A method for determining a degree of similarity between documents in a given document collection, the method comprising:
   modeling all said documents as labeled tree representations;
   building a computerized dictionary of path representations relating to paths that occur in said documents, wherein said path representations comprise a path in the tree representation of a document having a capability to include positional information of preceding sibling nodes that have a same label as a given node in a tree;
   storing, for at least two said documents, said labeled free representations of respective documents;
   storing, for said at least two said documents, said path representations relating to said paths that occur in said documents from root nodes to leaf nodes in said labeled tree representations of said respective documents;
   representing each of said documents in said document collection as an N-dimensional vector comprising an element i denoting a value of a feature associated with a particular path, wherein said feature comprises any of a presence or absence of said particular path in said documents and a frequency of occurrence of said particular path in said documents;
   calculating a measure of similarity between two of the documents based upon the frequency of occurrence of similar paths specified by the path representations; and
   using said measure of similarity to cluster a plurality of documents comprising similar information, wherein said documents comprise any of web page documents and eXtensible Markup Language (XML) documents, wherein two documents that differ only in the frequency of occurrence of the paths associated with said two documents are considered to be more similar to each other than two documents that differ in the occurrence of paths.

2. The method as claimed in claim 1, wherein the tree representation is a Document Object Model representation.

3. The method as claimed in claim 1, further comprising the step of generating a path representation for a path of a document as a sequence of labels representative from a root node to a leaf node in the labeled tree representation of the document.

4. The method as claimed in claim 1, further comprising the step of storing, as path representations, sets of sequenced labels representative of distinct paths in a labeled tree representation of a corresponding document.

5. The method as claimed in claim 4, further comprising the step of storing a path dictionary ($Dict_{paths} = \{p_1, p_2, \ldots, p_n\}$) of distinct paths collated from a tree representation for a document.

6. The method as claimed in claim 5, further comprising the step of eliminating selected paths from the path dictionary ($Dict_{paths}$).

7. The method as claimed in claim 6, wherein paths that occur highly frequently or highly infrequently are eliminated from the path dictionary ($Dict_{paths}$).

8. The method as claimed in claim 7, further comprising the step of computing the frequency of occurrence ($f_j(p_i)$) of a path ($p_i$) in a document ($d_j$).

9. The method as claimed in claim 8, further comprising the step of computing the maximum number of instances ($f_{max} = \max_{ij} f_j(p_i)$) in which a path ($p_i$) in the document ($d_j$) occurs.

10. The method as claimed in claim 9, further comprising the step of storing a representation of the document ($d_j$) as a N-dimensional vector ($[d_{j1}, d_{j2}, \ldots, d_{jn}]$, where $d_{jk} = f_j(p_k)/f_{max}$, $1 \leq k \leq N$) of relative frequencies of occurrence ($f_j(p_k)$) of paths ($p_k$) in the document ($d_j$).

11. The method as claimed in claim 8, further comprising the step of computing the minimum number of instances ($f_{min} = \min_{ij} f_j(p_i)$) in which a path ($p_i$) in the document ($d_j$) occurs.

12. The method as claimed in claim 10, further comprising the step of computing the similarity between a pair of documents ($d_i$, $d_l$) as a function ($sim(d_i, d_l)$) of metrics relating the number of paths common to the respective documents ($d_i$, $d_l$).

13. The method as claimed in claim 12, wherein the function for computing the similarity between a pair of documents ($d_i$, $d_l$)

$$sim(d_i, d_l) = sim(d_i, d_l) = \left( \frac{\sum_{k=1}^{N} \min(d_{ik}, d_{lk})}{\sum_{k=1}^{N} \max(d_{ik}, d_{lk})} \right)$$

is the quotient of a numerator, defined as the sum for all paths (k=1 . . . N) of the minimum number of instances ($\min(d_{ik}, d_{lk})$) in which paths occur in the respective documents ($d_i$, $d_l$), and a denominator, defined as the sum for all paths (k=1 . . . N) of the maximum number of instances ($\min(d_{ik}, d_{lk})$) in which paths occur in the respective documents ($d_i$, $d_l$).

14. The method as claimed in claim 1, wherein the tree representation of a document includes a positional index, which represents, for a node (n), the number of previous sibling nodes with the same label as that of node (n).

15. The method as claimed in claim 14, further comprising the step of storing as a path representation a set that defines positional information of sibling nodes under a parent node.

16. The method as claimed in claim 15, further comprising the step of storing precise path representations that precisely define a document structure, and generailsed path representations that partially generalise structural aspects of precise pat representations of a document.

17. The method as claimed in claim 16, wherein the step of calculating the measure of similarity involves determining a total number of precise path representations of one document that are either shared by the other document, or are a subsumed subset of at least one of the generalised path representations of the other document.

18. The method as claimed in claim 17, further comprising the step of normalising the measure of similarity by a term that represents the number of unique path representations shared by the two documents.

19. The method as claimed in claim 18, wherein the number of unique path representations is calculated by adding the number of path representations for each document, and subtracting from this total the number path representations shared by the two documents.

20. The method as claimed in claim 14, further comprising the step of storing as a path representation a sequence of terms separated by a delimiting symbol, in which each term is represented by a label and a parenthesised predicate that specifies the positional index of the term either specifically or generally.

21. A program storage device readable by computer, tangibly embodying a program of instructions executed by said computer to perform a method for determining a degree of similarity between documents in a given document collection, the method comprising:

modeling all said documents as labeled tree representations;

building a computerized dictionary of path representations relating to paths that occur in said documents, wherein said path representations comprise a path in the tree representation of a document having a capability to include positional information of preceding sibling nodes that have a same label as a given node in a tree;

storing, for at least two said documents, said labeled tree representations of respective documents;

storing, for said at least two said documents, said path representations relating to said paths that occur in said documents from root nodes to leaf nodes in said labeled tree representations of said respective documents;

representing each of said documents in said document collection as an N-dimensional vector comprising an element i denoting a value of a feature associated with a particular path, wherein said feature comprises any of a presence or absence of said particular path in said documents and a frequency of occurrence of said particular path in said documents;

calculating a measure of similarity between two of the documents based upon the frequency of occurrence of similar paths specified by the path representations; and using said measure of similarity to cluster a plurality of documents comprising similar information, wherein said documents comprise any of web page documents and eXtensible Markup Language (XML) documents, wherein two documents that differ only in the frequency of occurrence of the paths associated wit said two documents are considered to be more similar to each other than two documents that differ in the occurrence of paths.

22. The program storage device in claim 21, wherein said method further comprises the tree representation is a Document Object Model representation.

23. The program storage device in claim 21, wherein said method further comprises the step of generating a path representation for a path of a document as a sequence of labels representative from a root node to a leaf node in the labeled tree representation of the document.

24. The program storage device in claim 21, wherein said method further comprises the step of storing, as path representations, sets of sequenced labels representative of distinct paths in a labeled tree representation of a corresponding document.

25. The program storage device in claim 21, wherein the tree representation of a document includes a positional index, which represents, for a node (n), the number of previous sibling nodes with the same label as that of node (n).

26. A computer system adapted to determine a degree of similarity between documents in a given document collection, the computer system comprising:
   means for modeling all said documents as labeled tree representations;
   means for building a computerized dictionary of path representations relating to paths that occur in said documents, wherein said path representations comprise a path in the tree representation of a document having a capability to include positional information of preceding sibling nodes that have a same label as a given node in a tree;
   means for storing, for at least two said documents, said labeled tree representations of respective documents;
   means for storing, for said at least two said documents, said path representations relating to said paths that occur in said documents from root nodes to leaf nodes in said labeled tree representations of said respective documents;
   means for representing each of said documents in said document collection as an N-dimensional vector comprising an element i denoting a value of a feature associated with a particular path, wherein said feature comprises any of a presence or absence of said particular path in said documents and a frequency of occurrence of said particular path in said documents;
   means for calculating a measure of similarity between two of the documents based upon the frequency of occurrence of similar paths specified by the path representations; and
   means for using said measure of similarity to cluster a plurality of documents comprising similar information, wherein said documents comprise any of web page documents and eXtensible Markup Language (XML) documents,
   wherein two documents that differ only in the frequency of occurrence of the paths associated with said two documents are considered to be more similar to each other than two documents that differ in the occurrence of paths.

27. The computer system device in claim 26, wherein said representations is a Document Object Model representation.

28. The computer system device in claim 26, further comprising means for generating a path representation for a path of a document as a sequence of labels representative from a root node to a leaf node in the labeled tree representation of the document.

29. The computer system device in claim 26, further comprising means for storing, as path representations, sets of sequenced labels representative of distinct paths in a labeled tree representation of a corresponding document.

30. The computer system device in claim 26, wherein the tree representation of a document includes a positional index, which represents, for a node (n), the number of previous sibling nodes with the same label as that of node (n).

* * * * *